US006242825B1

United States Patent
Mori et al.

(10) Patent No.: US 6,242,825 B1
(45) Date of Patent: Jun. 5, 2001

(54) ELECTRIC ROTATING MACHINE WITH REDUCED THICKNESS AND VOLUME OF INSULATION

(75) Inventors: Hideaki Mori, Chiyoda-machi; Shigeo Amagi, Tokai-mura; Saburo Usami, Hitachi; Tadashi Sonobe, Iwaki; Yasuomi Yagi; Tomoya Tsunoda, both of Hitachi; Mitsuru Onoda, Takahagi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/443,106

(22) Filed: Nov. 18, 1999

(30) Foreign Application Priority Data

Nov. 25, 1998 (JP) .................................................. 10-333676

(51) Int. Cl.$^7$ ...................................................... H02K 15/12
(52) U.S. Cl. ............................................. 310/45; 174/127
(58) Field of Search .......................... 310/45, 196, 201, 310/208; 428/324, 328, 354; 174/127

(56) References Cited

U.S. PATENT DOCUMENTS

| 4,137,515 | * | 1/1979 | Akao et al. ........................ 336/84 C |
| 4,376,904 | * | 3/1983 | Horrigan .............................. 310/208 |
| 4,399,190 | * | 8/1983 | Iwabuchi et al. .................... 428/336 |
| 4,456,651 | * | 6/1984 | Pollmeier et al. ................... 428/324 |
| 4,481,438 | * | 11/1984 | Keim .................................... 310/201 |
| 4,806,806 | * | 2/1989 | Hjortsberg et al. .................... 310/45 |
| 5,079,077 | * | 1/1992 | Sakayanagi et al. ................ 442/212 |
| 5,099,159 | * | 3/1992 | Liptak et al. .......................... 310/45 |
| 5,300,844 | * | 4/1994 | Schuler ................................ 310/215 |
| 5,540,969 | * | 7/1996 | Schuler ................................ 442/212 |
| 5,574,325 | * | 11/1996 | Musil et al. ......................... 310/215 |
| 5,801,334 | * | 9/1998 | Theodorides ................... 174/120 SR |
| 5,945,764 | * | 8/1999 | Bendfeld ............................. 310/196 |
| 6,069,430 | * | 5/2000 | Tsunoda et al. ..................... 310/180 |
| 6,075,303 | * | 6/2000 | Schuler ................................ 310/201 |

FOREIGN PATENT DOCUMENTS

| 4235085A2 | * | 4/1993 | (DE) . |
| 9422180U1 | * | 9/1998 | (DE) . |
| 192523A | * | 8/1986 | (EP) . |
| 0266602B1 | * | 11/1988 | (EP) . |
| 63-110929 | * | 5/1988 | (JP) . |
| 9-45133 | * | 2/1997 | (JP) . |

* cited by examiner

*Primary Examiner*—Joseph Waks
(74) *Attorney, Agent, or Firm*—Antonelli, Terry, Stout & Kraus, LLP

(57) ABSTRACT

An the electric rotating machine which is compact and of reduced cost by improving the thermal conductivity of the main insulation in the thickness direction while maintaining the insulation breakdown voltage of the main insulation high. The initial breakdown voltage V in the thickness direction of the main insulator 30 of the stator winding 3 is higher than 20 kV/mm, and the thermal conductivity $\lambda$ in the thickness direction is within a range of 0.35 to 1 W/m·K, and the product V$\lambda$ of the initial breakdown voltage V and the thermal conductivity $\lambda$ satisfies a relationship of $7 \leq V\lambda \leq 20$ (MWA/m$^2$·K). The amount of resin is within a range of 20 to 50 weight % of the main insulation material.

9 Claims, 9 Drawing Sheets

ELECTRIC ROTATING MACHINE WITH REDUCED THICKNESS AND VOLUME OF INSULATION

BACKGROUND OF THE INVENTION

The present invention relates to an electric rotating machine which can be reduced in size by improving the thermal conductivity of an insulating material used therein.

A method of improving the thermal conductivity of a main insulator used in the stator windings of an electric rotating machine is described in, for example, an article entitled "An Improved Insulation System for the Newest Generation of Stator Windings of Rotating Machines", CIGTE, 1994 Session, August 28–September 3, 11, 101. In the described method, the overall thermal resistance of the stator windings is reduced by filling the main insulation with fine particles made of an insulation material having a high thermal conductivity, such as alumina. Further, a main insulator formed by adding high thermally conductive particles or a composite of the particles and glass fiber into mica bonding layers is disclosed in Japanese Patent Application Laid-open No.63-110929 and Japanese Patent No. 127364 (1987). Furthermore, an insulation formed by bonding a tape made of mica and glass fiber cloth is disclosed in Japanese Patent No. 411834.

Although the thermal conductivity of a main insulator used in the stator windings of an electric rotating machine has been increased as described above, the overall thermal resistance of the main insulator of the stator windings can not be decreased when the heat load is increased as the electric power generating capacity increases. When the electric power generating capacity is increased, the voltage generated in the stator windings is generally increased and, consequently, the thickness of the main insulator must be increased in order to obtain a required electric insulating property. Particularly, in a case where the breakdown voltage per unit of thickness of the main insulator is low, the thickness of the main insulator increases. Therefore, when an attempt is made to increase the electric power generating capacity while keeping the size constant, the thickness of the main insulator has to be increased, and, accordingly, the machine size inevitably increases.

SUMMARY OF THE INVENTION

An object of the present invention is to provide an electric rotating machine which is small in size and low in cost by reducing the necessary thickness and volume of insulation through an adjustment of the breakdown voltage and thermal conductivity of an insulator and an insulation composing the other insulations. Further, another object of the present invention is to provide a method of measuring the thermal conductivity of an insulator under a condition in which the insulator is applied to an electric conductor.

An essential feature of the present invention is that a main insulator used in a stator winding of a rotary electric machine comprises a laminated layer composed of a first insulating layer formed by bonding a thin flake-shaped inorganic insulating material substantially excluding a granular filler with a thermosetting resin and a second insulating layer formed by dispersing a fiber insulating material and a high thermally conductive filler into a resin and curing the resin, wherein the initial breakdown voltage V is set to a value higher than 20 kV/mm, and the thermal conductivity $\lambda$ in a thickness direction of the laminated layer is within a range of 0.35 to 1 W/m·K, preferably 0.5 to 1 W/m·K, and the product V·$\lambda$ of the initial breakdown voltage and the thermal conductivity is set so as to satisfy the relationship of $7 \leq V\lambda \leq 20$ (MVW/m$^2$·K). In order to obtain the above-described thermal conductivity $\lambda$, an insulation satisfying the value V$\lambda$ described above is formed by filling or mixing a granular insulating material having a high thermal conductivity higher than 5 W/m·K into a resin together with a fiber cloth.

The first insulation layer is formed by bonding a flake-shaped insulating material, such as mica, having a high electric insulating property capable of ensuring a high dielectric strength, with a thermosetting resin. A granular hard insulating material is not added in the first insulation layer so that the insulating material flakes are aligned and bonded in a layer shape and so as to prevent the flake-shaped insulating material from being broken. This point is based on an idea completely different from the prior art described above.

The second insulation layer contains a fiber cloth, such as a glass fiber, or a plastic tape, such as a polyimido film. The fiber cloth is necessary for increasing the mechanical strength of the insulating material layer and for forming the composite laminated body composing the main insulation into a tape. Either woven cloth or unwoven cloth may be employed as the cloth. The granular high thermally conductive insulating material is indispensable for increasing the thermal conductivity of the main insulation tape, and a material having a thermal conductivity higher than 5 W/m·K, particularly, higher than 30 W/m·K, is employed as the granular high thermally conductive insulating material. The cloth and the granular or flaky filler are mixed in a thermosetting resin, and the resin is cured.

One or more of the first insulation layer and the second insulation layer are employed alternatively. An amount of the resin is selected so that the thermal conductivity in the thickness direction of the laminated body attains a value higher than 0.3 W/m·K, particularly within a range of 0.35 to 1 W/m·K, preferably within a range of 0.5 to 1 W/m·K. The initial breakdown voltage of the laminated body depends on the amount of the resin being used. When the amount of resin is too small, the initial breakdown voltage of the insulation tape becomes insufficient. When the amount of resin is too large, the thermal conductivity of the insulation tape becomes insufficient. The amount of the resin in the insulation tape is preferably within a range of 20 to 50 weight %.

The insulation used for the second insulation layer may be used as a spacer insulation. The amount of the resin and the amount of the filler are adjusted so that the thermal conductivity of the second insulation layer becomes within the range of 0.35 to 1 W/m·K, and the initial breakdown voltage becomes higher than 20 kV.

The amount of insulating material added in the resin is adjusted so that the above-mentioned value V$\lambda$ is satisfied, the necessary thermal conductivity is obtained, and the breakdown voltage is not decreased. In the case of a rotary electric machine in which the inside of the rotary electric machine is cooled by hydrogen when the value V$\lambda$ of the stator windings using the main insulation set within the above-mentioned range is used in the electric rotating machine, a ratio of a product of the diameter of the rotor squared and the shaft length of the stator to the electric generating capacity per number of rotations becomes smaller than 40 m$^3$·rpm/MVA, and the ratio of a product of the diameter of the rotor squared and the length between supports of the rotor to the electric generating capacity per number of rotations becomes smaller than 50 m$^3$·rpm/MVA.

In the case of an electric rotating machine in which the inside of the electric rotating machine is cooled by air, the ratio of the product of the diameter of the rotor squared and the shaft length of the stator to the electric generating capacity per number of rotations becomes smaller than 70 m$^3$·rpm/MVA, and the ratio of the product of the diameter of the rotor squared and the length between supports of the rotor to the electric generating capacity per number of rotations becomes smaller than 85 m$^3$·rpm/MVA.

Further, the present invention improves the thermal conductivity of a rotating electric machine by filling or mixing insulating materials having a thermal conductivity higher than 5 W/m·K into insulators in the rotor, such as a slot insulator, an insulating block or a retaining insulator, or spacers interposed between windings at an end portion of the stator winding. Furthermore, the present invention can be applied to a conductor sheathed with an insulating tape containing a woven inorganic or organic fiber as a base material, and the thermal conductivity of the insulation-sheathed conductor is improved by using such insulating materials.

The main insulation is formed by filling or mixing a granular insulating material and/or a short-fiber insulating material and/or a thin flake-shaped insulating material having a thermal conductivity higher than 5 W/m·K into a thermosetting resin, a thermoplastic resin or a rubber material, so that the initial breakdown voltage becomes higher than 20 kV/mm and the thermal conductivity becomes within the range of 0.35 to 1 W/m·K. An insulation having a thermal conductivity within the range of 0.35 to 1 W/m·K is formed by filling or mixing a fine granular insulating material or a fiber insulating material having a thermal conductivity higher than 5 W/m·K into a thermosetting resin, a thermo-elastic resin or a rubber, and the insulation may be interposed as a spacer between the windings at the end portion of the stator.

In accordance with the present invention, the thermal conductivity of an object is measured by attaching a heat insulating block onto the measured object formed on a rotary electric machine or the like, and a heating member, such as a heating wire, a film heater or a combination of a wire and a film heater, is attached onto a surface or a local surface of the heat insulating block, whereby the block member is heated by the heating member, and then the change of temperature of the block member is measured.

The high thermally conductive insulation materials having a thermal conductivity higher than 5 W/m·K usable in accordance with the present invention are boronnitride, aluminum nitride, silicon nitride, alumina, magnesium oxide, beryllium oxide, silicon carbide and the like. Particularly, alumina, boron nitride, and magnesium oxide are preferable because the thermal conductivity thereof is above 30 W/m·K and the bulk resistance is above $10^{13}$ Ωcm. These compounds are used in the form of particles having an average diameter smaller than 20 μm. An insulation material containing glass fiber or another organic or inorganic fiber is known, and the fiber is mixed in a resin together with the above-mentioned granular insulation material.

Since a high breakdown voltage is required for the main insulation, the main insulation employs a laminated composite insulation formed by bonding the thin flake-shaped inorganic material with a bonding resin (the insulation shares particularly the withstanding voltage) and an insulation formed by dispersing the fiber and/or particles described above in a resin. In the case where a slightly brittle inorganic insulation material, such as mica, is used for the thin flake-shaped insulation material, the particles and the fiber described above are mixed into the insulation layer as small as possible. If mixed, the thin flakes of mica can not be aligned in a layer shape to decrease the dielectric strength, and the mica may be broken to further decrease the dielectric strength.

An insulation material formed by dispersing a short fiber or particles in the resin is used for an insulation, such as the spacer which requires not so high a withstanding voltage compared to the main insulation. The fiber filler may be in the form of woven cloth, such as a glass cloth, or nonwoven cloth or a short fiber.

In order to maintain the mechanical strength of the spacer, the fiber cloth is necessary. Such insulation may be used by laminating the cloth in plural layers. Particularly, in a case of using woven cloth, such as glass cloth, an insulation having a necessary thickness can be formed by laminating the woven cloth.

The amount of resin in the first insulation layer and the second insulation layer is preferably 10 to 25 weight % of the total amount of the resin and the filler. When the amount of resin is below 10 weight %, the withstanding voltage of the insulation becomes insufficient, though the thermal conductivity becomes high. Since the main insulation of a large capacity electric rotating machine requires a withstanding voltage above 20 kV/mm, the amount of resin is set above 10 weight % in order to sufficiently ensure the dielectric strength.

On the other hand, when the amount of resin exceeds 25 weight %, the thermal conductivity becomes insufficient because of a lack of the high thermal conductive filler, and, accordingly, the machine becomes larger in size due to necessity of increasing the thickness of the main insulation layer. The amount of the resin in the laminated insulation having the first insulation layer and the second insulation layer is preferably 20 to 50 weight % of the total amount of the filler and the resin.

The resins usable in accordance with the present invention are thermosetting resins, such as epoxy resin, unsaturated polyester resin, alkyd resin, polyamide resin and so on, for the main insulation. When the insulation proposed by the present invention is used for a spacer, a thermoplastic resin such as a saturated polyester resin or rubber-like acrylnitrilebutadiene copolymer may be used.

A method of molding the main insulation on the conductor of a electric rotating machine will be described in DESCRIPTION OF THE PREFERRED EMBODIMENTS in detail, though a conventional method may be used.

According to the present invention, since the thermal conductivity can be improved while maintaining a high initial insulating breakdown voltage of the main insulation of the stator winding, the thickness of the main insulation can be reduced and the temperature rise of the machine can be suppressed. Consequently, the machine size can be reduced and the cost can be reduced.

DESCRIPTION OF THE PREFERRED EMBODIMENTS

Figure 1:
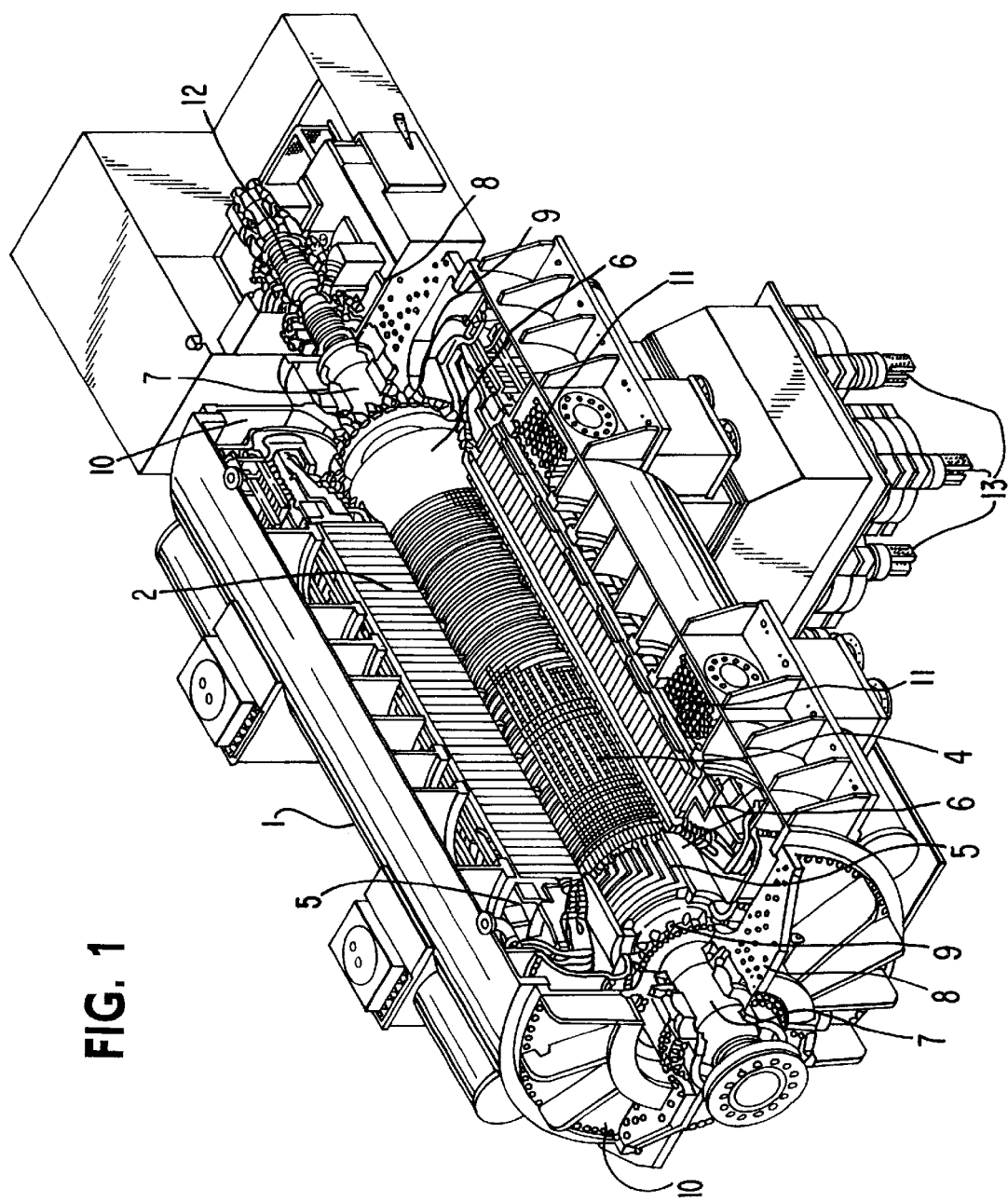
FIG. 1 is a perspective view showing the construction of an embodiment of a turbine generator in accordance with the present invention.
Figure 2:
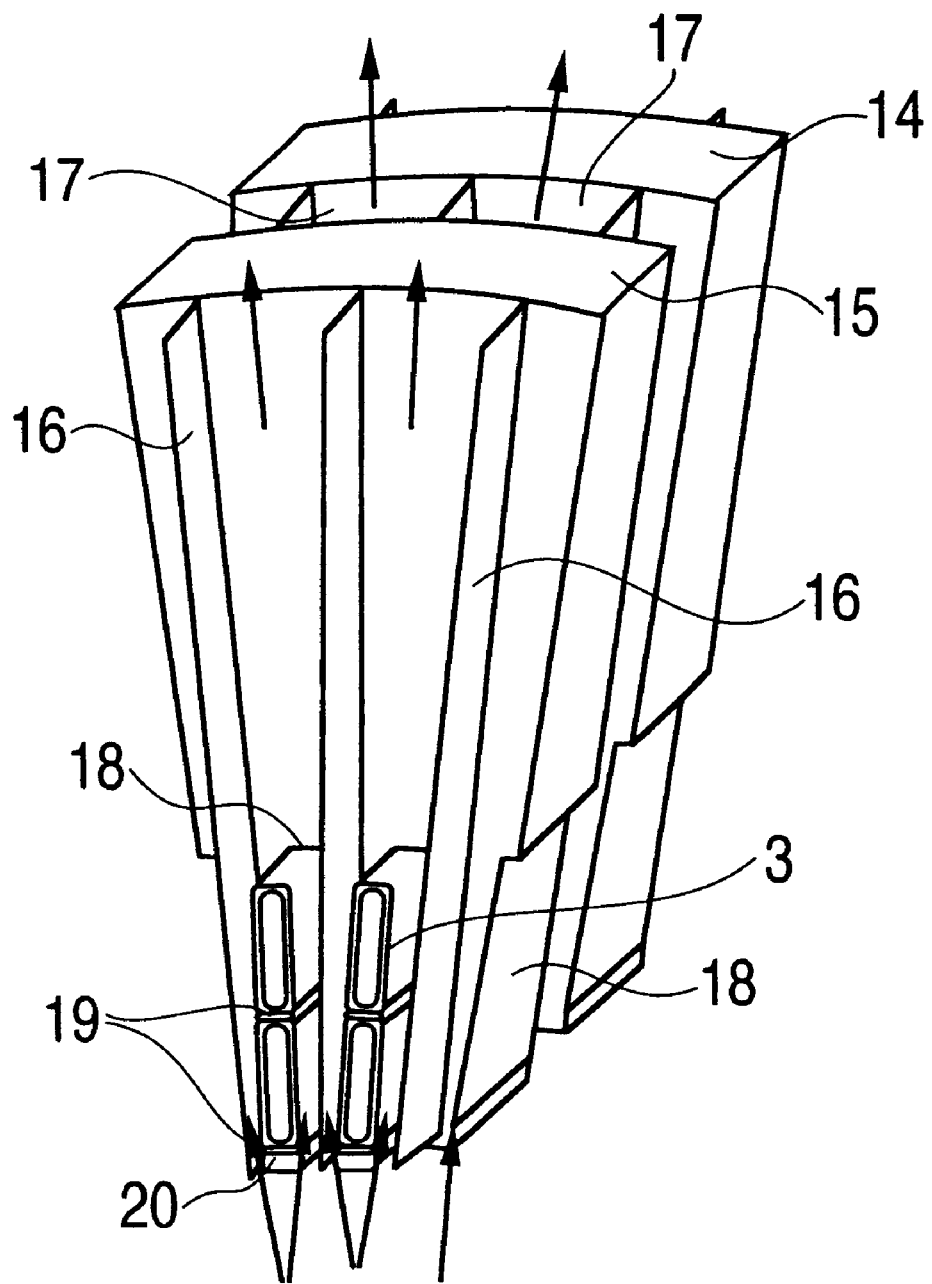
FIG. 2 is a perspective view showing the structure of the stator of FIG. 1.
Figure 3:
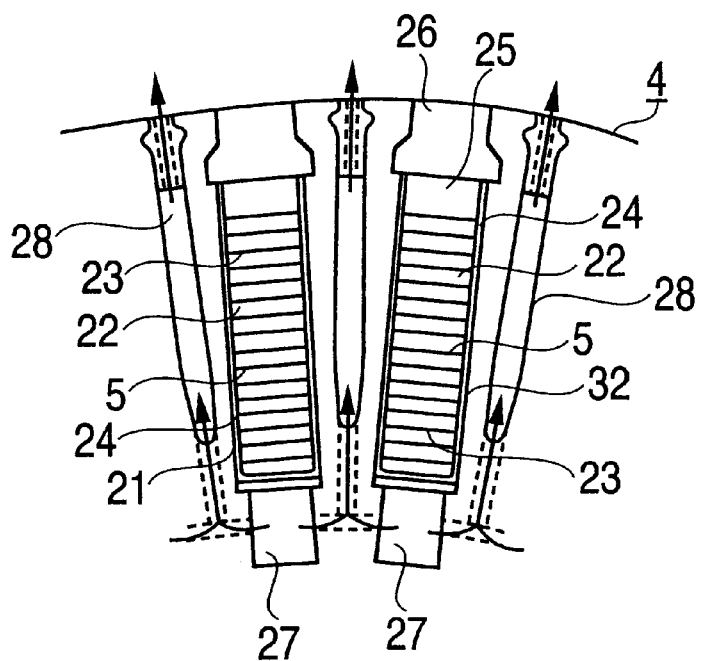
FIG. 3 is a perspective view showing the structure of the rotor of FIG. 1.

FIG. 1 to FIG. 3 show the construction of an embodiment of a turbine generator in accordance with the present invention. Referring to the figures, the reference character 1 denotes a stator frame, and a stator core 2 is disposed inside the stator frame. As shown in FIG. 2, the stator core 2 is a hollow cylindrical body which is formed by alternatively laminating core blocks 14 and spacer blocks in plural layers. The laminating core block is formed by laminating a plurality of thin ring-shaped silicon steel plates, and the spacer block is formed by arranging a plurality of spacers 16 in a circumferential direction with a constant pitch. By arranging the core blocks of silicon steel plates through the spacers 16 in plural layers as described above, a plurality of air ducts 17 communicating in the radial direction can be formed in the circumferential direction and in the axial direction in the stator core 2.

A plurality of slots 18 continuing in the axial direction are formed in the circumferential direction of the inner peripheral surface of the stator core 2. Stator windings 3 are contained in each of the slots 18. As shown in FIG. 2, each of the slots 18 has a rectangular cross-section, the longitudinal direction of which is orientated in the radial direction of the stator core, and the stator windings 3 are contained in the slot in a state of being stacked in two layers in the radial direction through an insulator 19. Each slot 18 is opened in the inner peripheral surface side of the stator core 2. Therefore, a wedge 20 is inserted in each of the slots 18 in the peripheral surface side of the stator core 2 radially inward of the stator windings 3 through an insulator 19 after containing the stator windings 3 so that the contained windings 3 are not allowed to come out of the slots 18. The structure of the stator winding 3 itself will be described later.

A rotor core 4 is rotatably disposed within the inner peripheral opening of the stator core 2 through a gap, that is, a so-called air gap. The rotor core 4 is formed in a unit together with a rotating shaft 7. The rotating shaft 7 is extended in the axial direction from the central portions of both end surfaces of the rotor core 4 and is rotatably supported by bearing units 8 located at the inner peripheral side of the end brackets 10, which close both ends of the stator frame 1. Fans 9 are provided at both sides of the rotor core 4 of the rotating shaft 7. The fan 9 is rotated together with the rotating shaft 7 so that a coolant filled in the machine is circulated in the machine.

A plurality of slots 21 continuing in the axial direction are provided in the outer peripheral surface of the rotor core 4. A sub-slot 27 communicated in the axial direction is formed in a bottom portion of each of the slots 21. A plurality of air slots 28 for effecting communication between the sub-slot 27 and the outer peripheral surface of the rotor core 4 are provided at each position between the slots 21. A rotor winding 5 is contained in each of the slots 21. As shown in FIG. 3, each of the slots 21 has a rectangular cross section, the longitudinal direction of which is orientated in the radial direction. The rotor windings 5 are formed by alternatively stacking rectangular winding conductors 22 and turn insulators 23 in plural layers in the radial direction.

A slot insulation 24 is placed between the rotor winding 5 and the slot 21. Each of the slots 21 is opened in the outer peripheral surface of the rotor core 4. Therefore, a wedge 26 is inserted in each of the slots 21 in the peripheral surface of the rotor core 4 outward from the rotor windings 5 through an insulator 25 after containing the rotor windings 5 so that the contained rotor windings 5 are not allowed to come out of the slots 21. Both ends of the rotor winding 5 are firmly fixed at both ends of the rotor core 4 using retainings 6 through retaining insulators.

A plurality of coolers 11 are placed between the stator frame 1 and the stator core 2. The coolers 11 are used for cooling a coolant, for example, air or hydrogen, which is filled in the machine. A current collector 12 for supplying electric power to the rotor windings 5 is connected to one end of the rotor shaft 7. The current collector 12 supplies electric power to the rotating rotor windings 5 by way of carbon brushes pressed onto the outer peripheral surfaces of springs connected to the rotor windings 5 and rotated together with the rotor shaft 7. Electric power obtained by electric generation is extracted from terminals 13 disposed on the outer side of the stator frame 1.

A cooling method as used in the present embodiment will be described below. In this embodiment, the inside of the machine is cooled by passing cooling water through the inside of the stator windings 3 or by circulating the in-machine filled air or hydrogen in the machine using the fans 9. In more detail, in the former method, a hollow-conductor is used for a winding conductor of the stator winding, box units called clips are attached to both ends of the stator winding 3, cooling water is supplied from one of the clips to effect cooling of the stator by conducting the cooling water through the inside of the stator winding, and the cooling water, after cooling the stator, is discharged from the other of the clips.

In the latter method, a coolant, such as air or hydrogen filled in the machine, is cooled by the coolers 11, and the cooled coolant is guided in the machine using the fans 9 to cool various portions in the machine. In more detail, the coolant cooled by the coolers 11 cools the various portions by flowing from the delivery side of the fan 9 to the air gaps between the rotor winding 5 and the rotor shaft 7 at the end of the rotor core 4 and between the stator core 2 and the rotor core 4, and to the space at the coil end portion of the stator winding 3. The arrows in FIG. 2 and FIG. 3 show the flow of the coolant.

The coolant guided between the rotor winding 5 and the rotor shaft 7 at the end of the rotor core 4 cools the end portion of the rotor winding 5. The coolant after cooling the end portion of the rotor winding 5 flows through the sub-slot 27 and the air slot 28 to cool the rotor core 4 from the inside. The coolant after cooling the rotor core 4 is guided to the air gap between the stator core 2 and the rotor core 4.

The coolant guided to the air gap cools the inner peripheral side of the stator 2 and the outer peripheral side of the rotor 4. The coolant after cooling the inside of the stator core 2 flows through a space between the stator frame 1 and the stator core 2, and then is cooled by the cooler 11.

The coolant guided to the space of the coil end portion of the stator windings 3 cools the coil end portion of the stator windings 3, and flows through a flow path in communication with the outer peripheral side of the stator core 2 to be guided to the outer side of the stator core 2. The coolant guided to the outer side of the stator core 2 flows through an air duct 17 to cool the stator core 2 from the inside. The coolant after cooling the stator core 2 from the inside is guided to the air gap to merge with the above-mentioned coolant guided to the gap, and flows through the air duct 17 and the space between the stator frame 1 and the stator core 2, and is cooled by the cooler Although it has been described in connection with this embodiment that the coolant filled in the machine is cooled by a cooler disposed in the machine, it is possible for the coolant to be cooled by a cooler placed outside the machine and then sent into the machine, whereby the coolant after cooling is collected so as to be cooled by the cooler, and then sent into the machine again.

Figure 4:
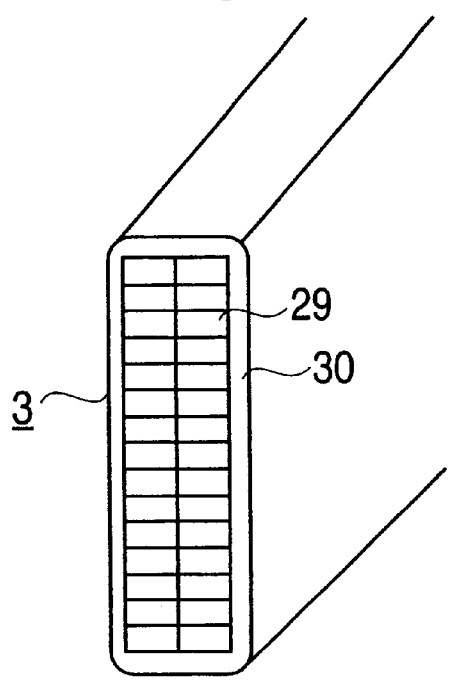
FIG. 4 is a perspective view showing the structure of the stator winding of FIG. 2.

The structure of the stator winding 3 will be described below in more detail. FIG. 4 shows the structure of an embodiment of the stator winding 3. The stator winding 3 is composed of a winding conductor 29, formed by arranging wires, having a rectangular cross-section being coated with wire insulation, in an m by n array (m, n are arbitrary integers), and a main insulation 30 coating the outer peripheral side of the winding conductor 29. The main insulation 30 is formed by wrapping a tape-shaped or sheet-shaped insulator in plural layers around the outer periphery of the winding conductor 29, impregnating it with a resin, and curing the resin. The number of turns used for wrapping the tape-shaped or sheet-shaped insulator is determined by the desired thickness of the main insulation 30, that is, by how strong the required insulating strength is to be. A corona shield for preventing corona discharge is wrapped around the outermost periphery of the main insulation 30.

Figure 5:
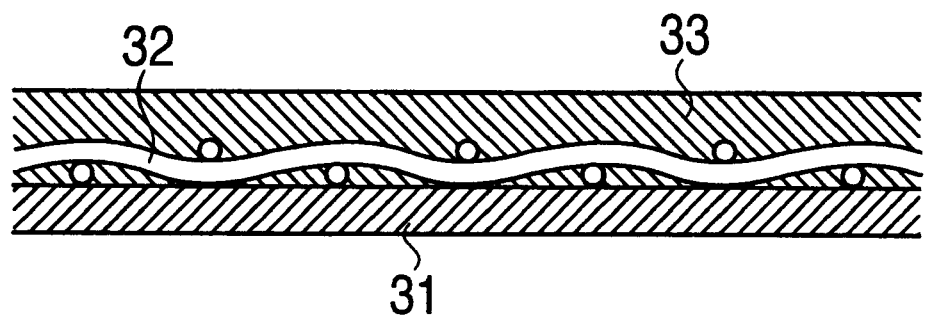
FIG. 5 is a cross-sectional view showing the structure of the insulating material used for forming the main insulator of FIG. 4.

The structure of the insulator forming the main insulation 30 will be described below. FIG. 5 shows the structure of the insulating material in this embodiment. The insulator is a laminate composed of a mica layer 31, a base layer 32 and a resin layer 33. The mica layer 31 is for ensuring the required electric insulating strength and contains a mica film. The base layer 32 is for ensuring the required mechanical strength and is interwoven with glass fiber. The resin layer 33 is formed of a resin which is impregnated into the mica layer 31 and the base layer 32 and is then cured, and a filler is filled or mixed in the resin layer.

The filler is a high thermally conductive electric insulator, such as alumina or aluminum nitride, having a thermal conductivity higher than 5 W/m·K, and is in the form of fine particles or short fibers or flakes. The base layer may be a cloth-shaped member formed by weaving alumina or aluminum nitride fiber. The resin layer 33 may be laminated in the side of the base layer 32, or in the side of the mica layer 31, or in both sides.

The above-described insulator is fabricated as follows. An embodiment will be described below. An aggregation mica sheet (a laminate composed of the mica layer 31 and the base layer 32) can be obtained by Initially preparing an aggregation mica film (165 g/m² weight) manufactured by making a suspension of mica particles in water into a sheet using a paper machine and glass cloth (35 g/m² weight), impregnating a resin prepared by adding $BF_3$ mono-ethylamine of 3 weight parts to novolak type epoxy resin of 100 weight parts into the aggregation mica film and the glass cloth, and then bonding them together.

After that, powder of alumina and the resin prepared by adding $BF_3$ mono-ethylamine of 3 weight parts to novolak type epoxy resin of 100 weight parts are mixed so that the weight ratio of the aluminua powder to the resin becomes 2:1, and methyl ethyl ketone of 10 weight % is added to them, and the mixture is applied onto the surface of the aggregation mica sheet in the base layer 32 side using a roll-coater so that the applied amount becomes 256 g/m².

Then, the methyl ethyl ketone is volatilized and removed in a drying furnace to obtain a sheet-shaped insulator. A tape-shaped insulator can be obtained by slitting the sheet-shaped insulator in 30 mm widths. The tape-shaped insulator obtained in the manner described above is called a prepreg tape, which contains a resin of 31.4 weight % to the total insulator weight, and a resin of 12.9 weight % to the total insulator weight in the mica layer 31, and a resin of 15.0 weight % to the total insulator weight in the base layer 32. The prepreg tape is applied to the winding conductor 29 as follows.

Initially, the tape-shaped insulator obtained as described above is wrapped in a partially overlapping manner on the outer peripheral side of the winding conductor 29. After that a mold release tape is wrapped on the outer peripheral side of the insulator. Then, a mold jig is attached around the insulator, and the resin contained in the insulator is cured by heating it at a preset temperature, while part of the resin contained in the insulator is being ejected by applying an external force to the outer surface through the mold jig. Thus, the main insulation 30 is formed on the outer peripheral side of the winding conductor 29 to obtain the stator winding 3.

Figure 6:
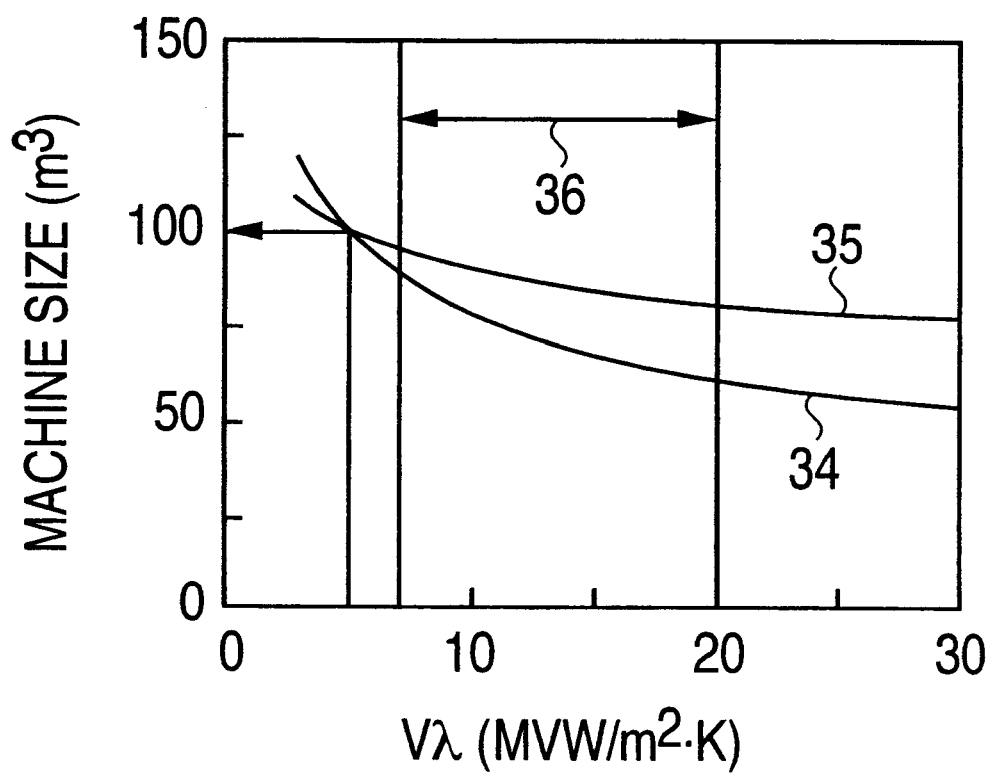
FIG. 6 is a graph showing the machine size versus the product Vλ of breakdown voltage V and thermal conductivity λ of the main insulator of the stator

The relationship of machine size versus the product Vλ of the breakdown voltage V and the thermal conductivity λ of the main insulation of the stator winding will be described below. FIG. 6 shows the machine size versus the product Vλ of the breakdown voltage V and the thermal conductivity λ of the main insulator of the stator winding when the machine size at the product Vλ=5 (MVW/m²·K) of the breakdown voltage V and the thermal conductivity λ of the main insulator of the stator winding is set to 100% (reference). In FIG. 6, a solid line 34 shows a case where hydrogen is used for cooling of the inside of the machine, and a solid line 35 shows a case where air is used for cooling of the inside of the machine. The product Vλ of the breakdown voltage V and the thermal conductivity λ means V/(1/λ)=(insulation resistance)/(thermal resistance), and it is clear from FIG. 6 that the machine size is decreased when the product Vλ of the breakdown voltage V and the thermal conductivity λ is increased.

The thickness of the main insulation of the stator winding needs to be sufficient to prevent electric breakdown in response to the generation voltage. However, because the main insulation of the stator winding obtained in the above manner can be made to have an initial breakdown voltage higher than 20 kV/mm, the minimum necessary thickness δ to the generation voltage, for example, 20 kV becomes 20 kV/(20 kV/mm)=1 mm. Since the breakdown voltage of the main insulation is reduced corresponding to its operating time, the thickness of the main insulation should be determined.

Further, the main insulation of the stator winding obtained in the above manner is filled or mixed with a granular insulating material or a short-fiber insulating material or a flake-shaped insulating material having a thermal conductivity higher than 5 W/m·K, such as alumina or aluminum nitride, and, accordingly, the thermal conductivity of the main insulation can be above 0.3 W/m·K. It is preferable from the viewpoint of cooling that the thermal conductivity of the main insulation is large. However, when the filling amount or the mixing amount of the insulating material, such as alumina or aluminum nitride, is excessively increased in order to increase the thermal conductivity, the ratio of the resin layer for protecting the mica layer and the base layer and for ensuring the strength is reduced to decrease the mechanical strength. Furthermore, the reduction rate of the temperature rise of the stator winding becomes smaller as the thermal conductivity λ is increased since the thermal resistance by heat transfer of the coolant becomes relatively large.

From the above, in this embodiment, the filling amount or the mixing amount of the granular insulating material or the short-fiber insulating material or the flake-shaped insulating material having a thermal conductivity higher than 5 W/m·K, such as aluminum oxide or aluminum nitride, is adjusted so that the product V·λ of the initial breakdown voltage and the thermal conductivity satisfies a relationship of $7 \leq V\lambda \leq 20$ (MVW/m²·K), and the thermal conductivity λ becomes higher than 0.3 W/m·K.

Further, taking into consideration the fact that the initial breakdown voltage V of the main insulation of the stator winding obtained in the above manner is higher than 20 kV/mm and the minimum value is 20 kV/mm, it is preferable that the thermal conductivity λ in the thickness direction of the main insulation of the stator winding satisfies the relationship $0.35 \leq \lambda \leq 1$ (W/m·K). Further, taking a margin of safety for variation in temperature distribution into consideration, it is preferable that the thermal conductivity λ in the thickness direction of the main insulation of the stator winding satisfies the relationship $0.5 \leq \lambda \leq 1$ (W/m·K).

A result of alternating current electric breakdown tests using the electric machine winding of the present embodiment and a comparative example of an electric machine winding will be described below, referring to Table 1. In the comparative example, the electric machine used an electric machine winding which had a high thermally conductive insulation formed of a high thermally conductive insulation tape fabricated as follows.

An aggregation mica sheet (a laminate composed of a mica layer and a reinforcing material layer) was obtained by initially preparing an aggregation mica film (165 g/m² weight) manufactured by making a suspension of mica particles in water into a sheet using a paper machine and glass cloth (35 g/m² weight), impregnating a resin by adding $BF_3$ mono-ethylamine of 3 weight parts to novolak type epoxy resin of 100 weight parts into the aggregation mica film and the glass cloth (an amount of impregnated resin was 40 g/m²), and then bonding them together.

After that, particles of alumina and the resin prepared by adding $BF_3$ mono-ethylamine of 3 weight parts to novolak type epoxy resin of 100 weight parts were mixed so that the weight ratio of the alumina particles to the resin became 3.5:1, and methyl ethyl ketone of 10 weight % was added to them, and the mixture was applied onto the surface of the aggregation mica sheet on the reinforcing material layer side using a roll-coater so that the applied amount became 230 g/m². Then, the methyl ethyl ketone was volatilized and removed in a drying furnace to obtain a high thermally conductive insulation sheet. A high thermally conductive insulation tape was obtained by slitting the high thermally conductive insulation sheet in 30 mm widths using-a slitter.

The total resin weight contained in the high thermally conductive insulation tape fabricated in the manner described above was 19.3 weight % to the total weight of the high thermally conductive insulation tape. The resin weight in the mica layer was 7.1 weight % to the total weight of the high thermally conductive insulation tape, and the resin weight in the high thermally conductive filler layer was 10.4 weight % to the total weight of the high thermally conductive insulation tape.

The electric machine winding was manufactured using the high thermally conductive insulation tape fabricated in the above manner. The manufacturing method was the same as in the present embodiment. Therefore, an explanation thereof will be omitted here.

In the alternating current breakdown voltage test, an aluminum film was wrapped on the outer periphery in the case of the embodiment of the electric machine winding and in the case of the comparative example of the electric machine winding to form an electrode, and the alternating current breakdown voltage was measured by applying an alternating current voltage between the aluminum electrode and the winding conductor of each of the electric machine windings. The results were as shown in Table 1.

TABLE 1

Measured results of breakdown voltage

|  | This embodiment | Comparative example |
| --- | --- | --- |
| Measured value (kV/mm) | 26.5 | 19.0 |
|  | 29.0 | 17.5 |
|  | 27.5 | 21.5 |
| Average value (kV/mm) | 27.7 | 19.3 |

It is clear from Table 1 that the electric machine winding of the present embodiment has a high alternative current breakdown voltage compared to that of the comparative example of the electric machine winding. This is because the high thermally conductive insulating sheath of the electric machine winding is formed using the high thermally conductive insulation tape in which the mica flakes are formed in a layer shape without defects, and the resin amount in the high thermally conductive filler layer is within the range of 10 to 25 weight % of the total material. This is because, at the time of forming the high thermally conductive insulating sheath of the electric machine winding, small bubbles contained in the high thermally conductive insulation tape can be sufficiently discharged together with part of the resin in the high thermally conductive insulation tape during the pressing process. Therefore, since the electric machine winding of the present embodiment has a high thermally conductive insulating sheath which has an excellent electric property and is compact in texture, the reliability of the electric rotating machine operated at a high voltage can be improved.

Figure 7:
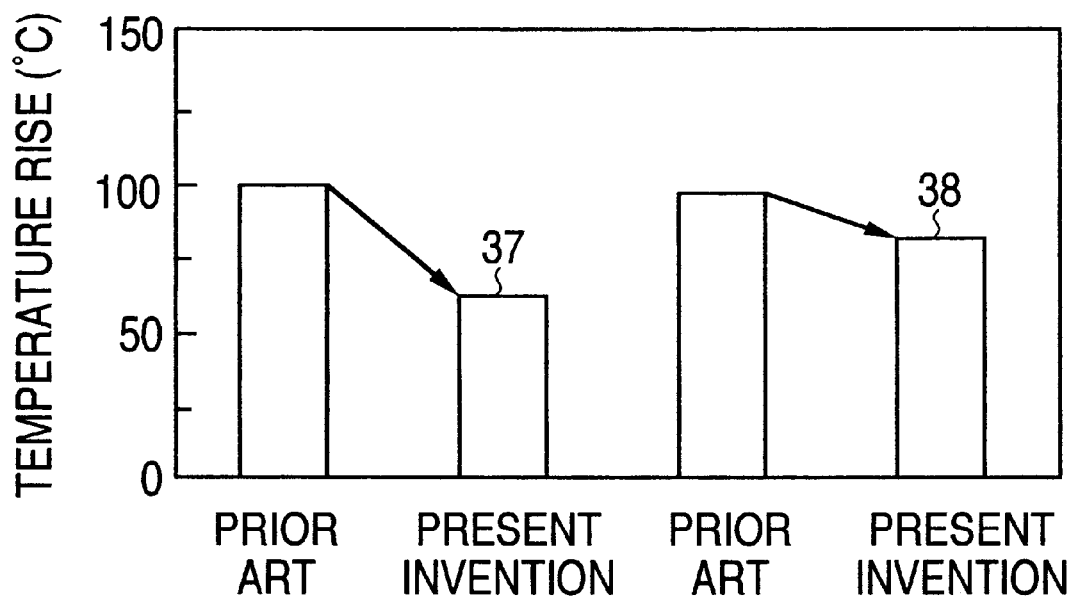
FIG. 7 is a bar chart showing the effect of reducing temperature rise when the main insulator of the stator winding of FIG. 4 is formed using the insulating material of FIG. 5.

Description will be made below concerning an effect of reducing the temperature rise of the stator winding in a case of using the stator winding of the present embodiment, in which the product V·λ of the breakdown voltage V and the thermal conductivity λ of the main insulation is set as described above. FIG. 7 is a bar chart showing the effect of reducing the temperature rise, and a comparison with the prior art. In FIG. 7, the bar 37 shows a case of using hydrogen for cooling the inside of the machine, and the temperature rise is reduced by above 30% compared to a case of the prior art. Since heat generation of the stator winding is in proportion to the square of the current, the reduction of above 30% means that the armature current of the stator winding can be increased by $\sqrt{1.3}=1.15$ times, and the electric output can be increased without changing the air cooling structure. Therefore, not only a new facility, but also a conventional facility, can provide increased output power by replacing stator windings with the stator windings of the present embodiment.

The bar 38 shows a case of using air for cooling the inside of the machine, and the temperature rise is reduced by above 15% compared to a case of the prior art. This case can be similarly considered as the above. Therefore, the reduction of above 30% means that the armature current of the stator winding can be increased by $\sqrt{1.15}=1.07$ times, and the electric output can be increased without changing the air cooling structure similarly to the above.

Figure 8:
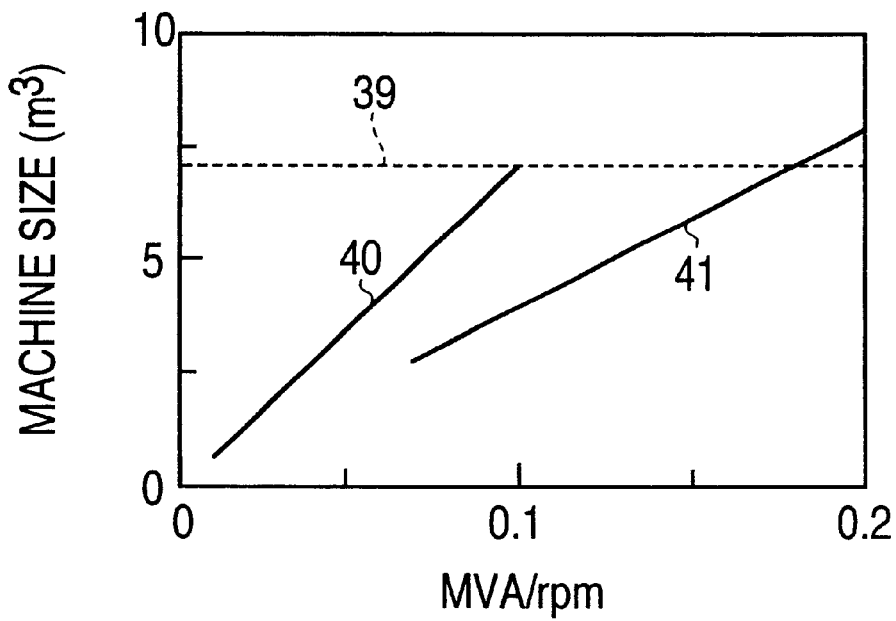
FIG. 8 is a graph showing the relationship between electric generating capacity and machine size of the turbine generator when the main insulator of the stator winding of FIG. 4 is formed using the insulation of FIG. 5.

The relationship of the machine size versus the electric generating capacity of a turbine generator will be described below. FIG. 8 shows the product of the square of the diameter of the rotor and the shaft length of the rotor, that is, the volume of a portion relating to the electric generation (ordinate) versus the electric generating capacity per number of rotations (abscissa). In comparing a case of using air for cooling the inside of the machine and a case of using hydrogen for cooling the inside of the machine, the machine using hydrogen can attain a larger generating capacity with the same machine size because the thermal conductivity and the heat capacity of the hydrogen are larger and, accordingly, the cooling ability is higher. There is a relationship in which the machine size is in proportion to the electric generating capacity per number of rotations.

In the case of using hydrogen for cooling the inside of the machine, as shown by the solid line 41 in FIG. 8, the ratio of the product of the square of the diameter of the rotor and the shaft length of the rotor to the electric generating capacity per number of rotations can be below 40 m³·rpm/MVA. In the case of using air for cooling the inside of the machine, as shown by the solid line 40, the ratio of the product of the square of the diameter of the rotor and the shaft length of the rotor to the electric generating capacity per number of rotations can be below 70 m³·rpm/MVA.

From the above, in the present embodiment, an air cooling generator of 150 MVA to 300 MVA class and a hydrogen cooling generator of 200 MVA to 500 MVA class can be provided, while suppressing an increase in the mechanical loss including the friction loss with fluid on the rotor surface.

In a machine size larger than 7 m³, it is difficult to provide a turbine generator of practical size since the temperature rise of the cooling fluid due to the mechanical loss increases. That is the dashed line 39 in FIG. 8 represents a limit.

Further, when the relationship shown in FIG. 8 is expressed by the relationship of the product of the square of the diameter of the rotor and the length between supports of the rotating shaft (distance between supporting bearings) versus the electric generating capacity per number of rotations, the ratio of the product of the square of the diameter of the rotor and the length between supports of the rotating shaft to the electric generating capacity per number of rotations can be below 50 m³·rpm/MVA for the case of using hydrogen for cooling the inside of the machine, and can be below 85 m³·rpm/MVA for the case of using air for cooling the inside of the machine.

Figure 9:
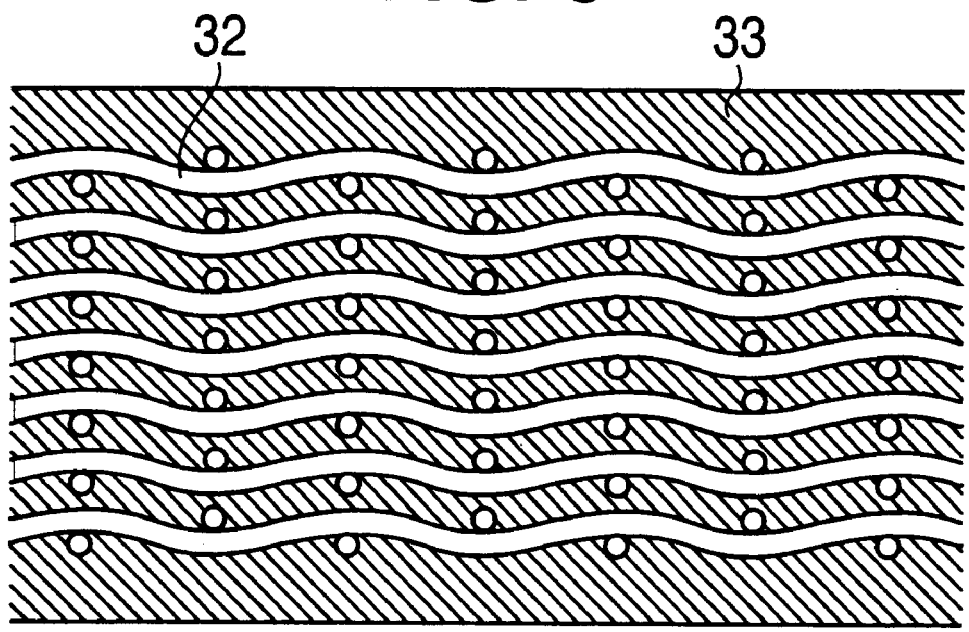
FIG. 9 is a diagram showing the structure of an embodiment of an insulator (for example, an insulation block) when the structure used for the insulation of FIG. 5 is applied to another insulation in the turbine generator.

Description will be made below concerning other insulators in the turbine generator to which the abovementioned insulating material is applied. FIG. 9 shows the structure of another insulator in the turbine generator. The other insulators here mean the slot insulation 24, the insulation block 25, the retaining insulation, the spacer interposed between windings in the coil end portion of the stator winding 3 and so on. Each of these insulators is a laminate which is formed by laminating base layers 32 interwoven with glass fiber and resin layers 33 in plural layers, and a high thermally conductive electric insulator, such as alumina or aluminum nitride, having a thermal conductivity higher than 5 W/m·K in the form of fine particles or short fibers or flakes is filled or mixed in the resin layer 33.

In the present embodiment, since the high thermally conductive electric insulator, such as alumina or aluminum nitride having a thermal conductivity higher than 5 W/m·K in the form of fine particles or short fiber or flakes, is filled or mixed in the resin layer 33, it is possible to improve the thermal conductivities of the slot insulation 24, the insulation block 25, the retaining insulation, the spacer interposed between windings in the coil end portion of the stator winding 3 and so on. By improving the thermal conductivity of each of the insulators, the temperature can be reduced. For example, by improving the thermal conductivities of the slot insulation 24 and the insulation block 25, the temperature of the rotor winding 5 can be reduced. When the thermal conductivity is increased to twice as high as a conventional value, the value of the temperature rise can be reduced by approximately 30% and the output of the turbine generator can be increased by $\sqrt{1.3}=1.15$ times.

Further, when there is a margin in the temperature rise of the stator, the output can be increased by nearly 15% by using the above-mentioned slot insulation when the rotor windings are renewed in preventive maintenance of the turbine generator. Although the above-mentioned slot insulation may be used for a direct cooling rotor, the effect of reducing the temperature of the field windings is approximately 10% because the ratio of cooling through the slot insulation is low in the direct cooling of a rotor. In a case of using air to cool the machine inside, the effect becomes even smaller due to the thermal resistance of air in the gap between the slot insulation and the slot or between the slot insulation and the rotor winding.

Figure 10:
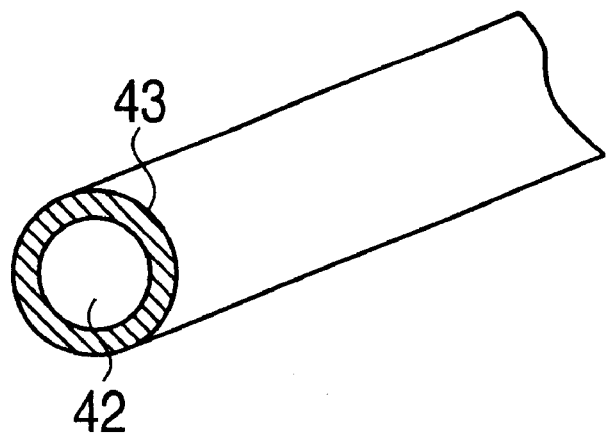
FIG. 10 is a perspective view showing the structure of an embodiment of an insulation-sheathed conductor having a circular cross-sectional shape in accordance with the present invention.
Figure 11:
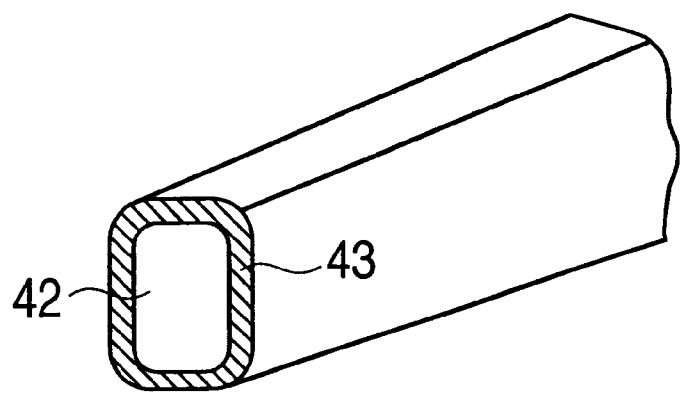
FIG. 11 is a perspective view showing the structure of an embodiment of an insulation-sheathed conductor having a rectangular cross-sectional shape in accordance with the present invention.
Figure 12:
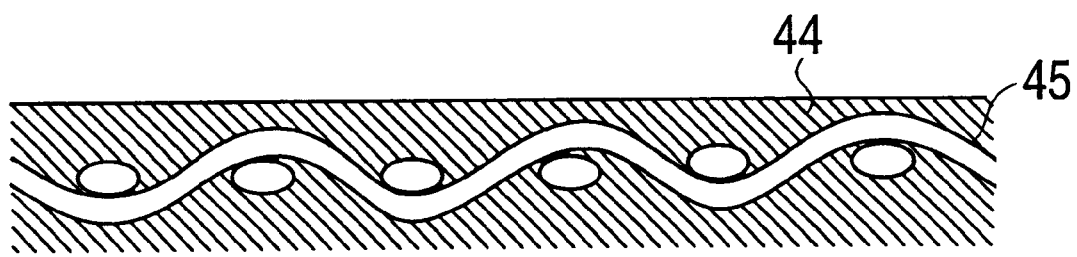
FIG. 12 is a cross-sectional view showing an example of the structure of the insulation sheath of FIG. 10 or FIG. 11.
Figure 13:
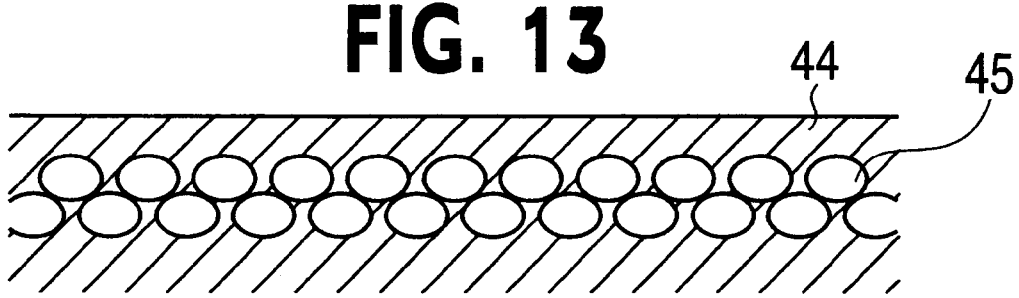
FIG. 13 is a cross-sectional view showing another form of the insulation sheath of FIG. 10 or FIG. 11.
Figure 14:
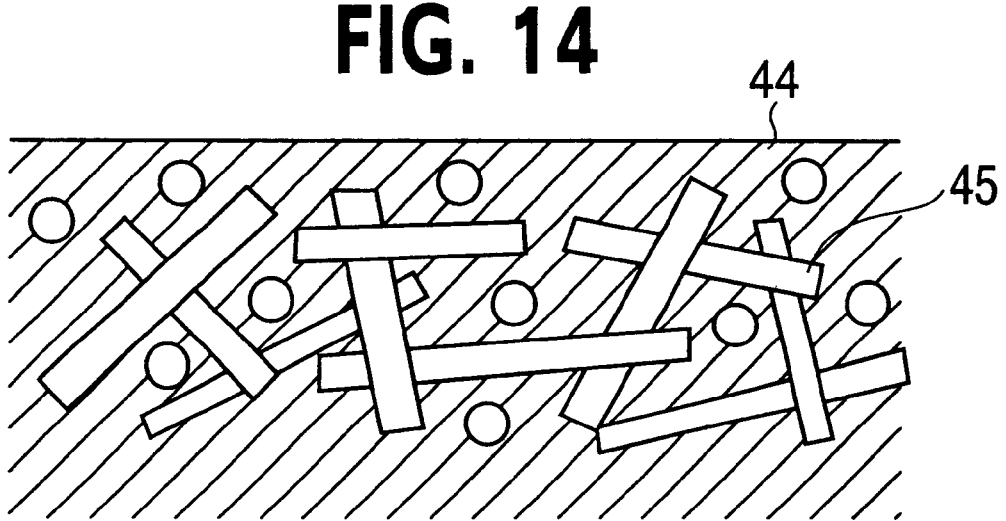
FIG. 14 is a cross-sectional view showing a further form of the insulation sheath of FIG. 10 or FIG. 11.

An embodiment of an insulation-sheathed conductor in accordance with the present invention will be described below. FIG. 10 to FIG. 14 show examples of the structure of an insulation-sheathed conductor in accordance with the present embodiment. The insulation-sheathed conductor is used in a rotor exciter of one of the main components of the turbine generator or stator windings of a motor, and has an insulation sheath formed of insulation materials as shown in FIG. 12 to FIG. 14. The insulation-sheathed conductor has a circular cross section as shown in FIG. 10 or a rectangular cross section as shown in FIG. 11.

Referring to the drawings, the reference character 42 is a conductor formed of a single wire or a stranded wire. The stranded wire may be covered with an insulation sheath on a wire basis depending on the purpose of use. An insulation sheath 43 is applied on the outer periphery of the conductor 42. The insulation sheath 43 is made of a resin 44, a base material 45 filled or mixed with the resin 44 and a filler filled or mixed in gaps between fibers of the base material 45. The base material 45 is used for ensuring the required mechanical strength of the insulation material, and is a tape interwoven with a fiber of an inorganic or organic material. The filler is a high thermally conductive electric insulator, such as alumina, having a thermal conductivity higher than 5 W/m·K in the form of a fine particle-shape or a thin flake-shape. The base material 45 may be a roping material (a long fiber material) as shown in FIG. 13 or a short fiber material as shown in FIG. 14.

According to the present embodiment, since a high thermally conductive electric insulator is filled or mixed in gaps between fibers of the base material 45, as described above, the thermal conductivity of the insulation sheath can be increased. Although glass fiber cloth is often used in the base material 45, the thermal conductivity of the insulation sheath can be easily increased by using fiber cloth made of aluminum oxide from the beginning without additionally filling or mixing the high thermally conductive insulator into the base material 45.

Figure 15:
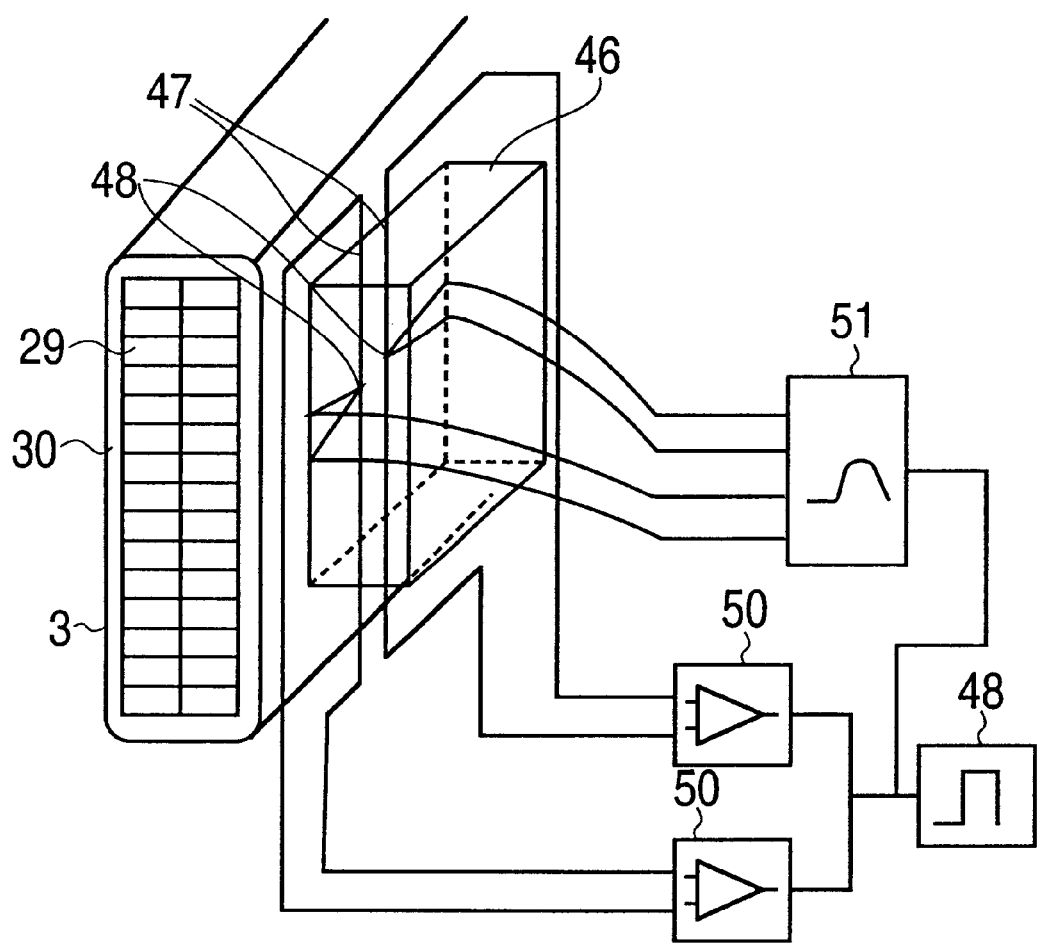
FIG. 15 is a diagram used for explaining a method of measuring the thermal conductivity of an embodiment of an insulator in accordance with the present invention, and showing the configuration of an apparatus for performing the thermal conductivity measuring method.

A method of measuring the thermal conductivity in the present embodiment will be described below. FIG. 15 shows the configuration of an apparatus for performing the method of measuring the thermal conductivity of the insulator in the present embodiment, and particularly shows a feature of measuring the thermal conductivity of the main insulation of the stator used in a turbine generator. The thermal conductivity measuring method of the present embodiment is an application of a non-steady state heat wire method, in which a measurement can be performed under a condition where the main insulation 30 is coated onto the winding conductor 29. The method of measuring the thermal conductivity in the present embodiment will be described below in detail.

Initially, two heating members 47, such as wire heaters or film heaters, are attached on one side surface of a heat insulating block 46 in parallel to each other. The heat insulating block 46 is made of a material having an isotropic thermal conductivity. The thermal conductivity of the heat insulating block 46 has been measured through a steady state heat flow method in advance. After that, temperature sensors 48, such as thermocouples, are arranged in middle portions of the heating members 47. In describing this embodiment, a combination of the heat block 46, the heating members 47 and the temperature sensors 48 is called a heat conduction measurement head.

After preparing the heat conduction measurement head, the heat conduction measurement head is pushed in contact with a side surface of the stator winding 3 of an object to be measured. After that, a pulse signal is generated from a pulse generator 49 and is amplified by an amplifier 50. The amplified pulse signal is applied to one of the heating members 47 to transiently heat the heating members 47. Then, a change of the temperature at that time is measured by the temperature sensors 48 and detected by a measuring unit 51. The measuring unit 51 measures the composite thermal conductivity in the direction of the plane of contact of the heat conduction measurement head and in a direction of the thickness of the insulator by the method described in The Transactions of The Japan Society of Mechanical Engineers (Series B), Vol.48, No.433, pp.1743–1749 (September 1982).

After completion of the above-mentioned measurement, both of the heaters 47 are heated, and a change of the temperature is measured by the temperature sensors 48 and detected by a measuring unit 51. According to this method, because the heat flow in the surface direction of the insulator placed between the two heating members 47 is small and the heat flow in the thickness direction of the insulator is relatively larger, the thermal conductivity dominant in the thickness direction of the insulator can be measured. Therefore, the thermal conductivity of the main insulation 30 can be measured under a condition in which the main insulation 30 is coated onto the winding conductor 29.

Before performing the measurement, transient temperature analyses are performed on cases in which the heating members are heated for various kinds of materials to obtain values of thermal conductivity capable of expressing the optimal temperature distributions at both of the above-mentioned measurements through a parameter survey, and the obtained value is regarded as a true value. By doing so, when the thermal conductivity of the main insulation of a rotary electric machine is measured, it is possible to verify whether the machine size can be reduced or not.

What is claimed is:

1. An electric rotating machine comprising a stator, and a rotor rotatably disposed in said stator through a gap, said stator having windings sheathed outside with a main insulator, wherein said main insulator comprises a laminated layer composed of a first insulating layer formed by bonding a thin flake-shaped high dielectric strength insulating material with a thermosetting resin substantially free of a granular filler and a second insulating layer formed by dispersing a fiber insulating material and a high thermal conductive filler in a resin;

an initial breakdown voltage V in a thickness direction of the main insulator being a value higher than 20 kV/mm, and a thermal conductivity $\lambda$ in the thickness direction of said laminated layer being within a range of 0.35 to 1 W/m·K, and the product V·$\lambda$ of the initial breakdown voltage and the thermal conductivity satisfying a relationship of $7 \leq V\lambda \leq 20$ (MVW/m$^2$·K).

2. An electric rotating machine according to claim 1, wherein said thermal conductivity $\lambda$ is within a range of 0.5 to 1 W/m·K.

3. An electric rotating machine according to claim 1, wherein said second insulating layer is an insulation formed by dispersing a granular insulating material having a thermal conductivity higher than 20 W/m·K in a resin together with a fiber cloth.

4. An electric rotating machine according to claim 1, wherein an insulation is interposed between the windings in an end portion of said stator winding as a spacer, said insulation being formed by filling or mixing a granular insulating material and/or a short-fiber insulating material having a thermal conductivity higher than 5 W/m·K in a thermosetting resin or a thermoplastic resin.

5. An electric rotating machine according to claim 1, wherein a thermal conductivity of said main insulator measured by a thermal conductivity sensor is higher than 0.35 W/m·K.

6. An electric rotating machine according to claim 1, wherein the inside of the electric rotating machine is cooled by hydrogen, and a ratio of a product of a diameter of said rotor squared and the shaft length of said stator to an electric generating capacity per number of rotations is smaller than 40 m$^3$·rpm/MVA.

7. An electric rotating machine according to claim 1, wherein the inside of the electric rotating machine is cooled by air, and a ratio of a product of a diameter of said rotor squared and the shaft length of said stator to an electric generating capacity per number of rotations is smaller than 70 m$^3$·rpm/MVA.

8. An electric rotating machine according to claim 1, wherein the inside of the electric rotating machine is cooled by hydrogen, and a ratio of a product of a diameter of said rotor squared and a length between supports of said rotor to an electric generating capacity per number of rotations is smaller than 50 m$^3$·rpm/MVA.

9. An electric rotating machine according to claim 1, wherein the inside of the electric rotating machine is cooled by air, and a ratio of a product of a diameter of said rotor squared and a length between supports of said rotor to an electric generating capacity per number of rotations is smaller than 85 m$^3$·rpm/MVA.

* * * * *